United States Patent [19]

Nagaoka et al.

[11] 4,145,399

[45] Mar. 20, 1979

[54] PROCESS FOR THE REMOVAL OF NITROGEN OXIDE

[75] Inventors: Tokuzo Nagaoka; Takamoto Nishimura; Satoru Ono, all of Ube; Simaiti Nagata, Onoda; Naoki Yamashita, Ube; Yoshiyuki Tanaka, Ube; Yoshihiko Hatabu, Ube, all of Japan

[73] Assignee: Ube Industries, Ltd., Ube, Japan

[21] Appl. No.: 871,432

[22] Filed: Jan. 23, 1978

[30] Foreign Application Priority Data

Jan. 31, 1977 [JP] Japan .................................. 52-8820

[51] Int. Cl.$^2$ ............................................. C01R 21/00
[52] U.S. Cl. ...................................... 423/235; 423/395
[58] Field of Search ................................. 423/235, 395

[56] References Cited

U.S. PATENT DOCUMENTS

| | | | |
|---|---|---|---|
| 1,949,462 | 3/1934 | Fogler | 423/395 |
| 2,072,947 | 3/1937 | Fogler et al. | 423/395 |
| 3,348,914 | 10/1967 | Quanquin et al. | 423/235 X |
| 3,453,071 | 7/1969 | Schmitt et al. | 423/235 |

FOREIGN PATENT DOCUMENTS

| | | | |
|---|---|---|---|
| 48-32766 | 5/1973 | Japan | 423/325 |
| 50-39275 | 4/1975 | Japan | 423/235 |

OTHER PUBLICATIONS

Webb; H. W., *Absorption of Nitrous Gases*, Longmans, Green & Co., N. Y., 1923, pp. 311–315.

*Primary Examiner*—G. O. Peters
*Attorney, Agent, or Firm*—Miller & Prestia

[57] ABSTRACT

A process for removing nitrogen oxides ($NO_x$) from a waste gas containing 300 through 20,000 ppm of $NO_x$ is disclosed. In the process, the waste gas containing $NO_x$ is adjusted to a molar ratio of $NO/NO_2$ of approximately 1 and is then scrubbed with a scrubbing solution containing an alkali metal hydroxide in a first column. The scrubbing solution is removed from the first column before the alkali metal hydroxide is completely consumed. The removed scrubbing solution is then contacted in a second column with a gas having 1.0 through 60.0% by volume $NO_x$ which has been adjusted to a molar ratio of $NO/NO_2$ of approximately 1. Thus, the $NO_x$ content of the purified gas can be lowered to far less than 200 ppm and post-treatment problems of the scrubbed solution can be effectively solved.

16 Claims, 2 Drawing Figures

PROCESS FOR THE REMOVAL OF NITROGEN OXIDE

BACKGROUND OF THE INVENTION

1. Field of the Invention

The present invention relates to improvements in a process for removing nitrogen oxides ($NO_x$), including nitrogen monoxide (NO) and nitrogen dioxide ($NO_2$), from a waste gas containing nitrogen oxides and carbon dioxide ($CO_2$) by contacting the waste gas with an aqueous alkaline scrubbing solution.

2. Description of the Prior Art

It was heretofore known that $NO_x$ present in a waste gas can be scrubbed with an aqueous alkaline scrubbing solution containing alkali metal hydroxides after adjusting the $NO/NO_2$ molar ratio of the $NO_x$ to approximately 1. However, in the case where an aqueous alkaline scrubbing solution containing alkali metal hydroxides is industrially carried out, there are various problems in that, for instance: (a) the $NO_x$ treating facilities including the absorption or scrubbing column become large; (b) the post-treatments of the scrubbed solution are troublesome, and; (c) the $NO_x$ content of the purified gas cannot be lowered below 200 ppm in the case of continuous operation. Although various processes to improve these problems have been proposed in the field, the problems of the post-treatments of the scrubbed solution still exist.

Japanese Laid-Open Patent Application (KOKAI) NO. SHO 50-85578 (1975) discloses a process for removing $NO_x$ in a gas with an aqueous alkaline solution by using a gas dispersion type absorption apparatus. However, when this process is carried out on an industrial scale, there are also problems in that: (a) the alkaline content of the scrubbing solution cannot be increased due to the structure of the dispersing means; (b) a continuous operation is impossible because of the plugging of the dispersing means by impurities, and; (c) it is difficult to lower the $NO_x$ content of the purified gas below 200 ppm in the case of a continuous operation. Therefore, even though processes for removing $NO_x$ by using an aqueous alkaline solution cotaining alkali metal hydroxides have been known for a long time, they are not practically used in an industrial scale.

SUMMARY OF THE INVENTION

The objects of the present invention are to obviate the above-mentioned problems of the known processes for the removal of nitrogen oxides from waste gases by using an aqueous alkaline solution containing alkali metal hydroxides, and to provide a process for removing nitrogen oxides from waste gases containing $NO_x$ and carbon dioxide, especially, waste gases from nitric acid manufacturing plants, by using an aqueous alkaline scrubbing solution containing cheap and readily available alkali metal hydroxides without causing the various problems mentioned above in an industrial operation.

Other objects and advantages of the present invention will be apparent from the following description.

In accordance with the present invention, there is provided a process for removing nitrogen oxides ($NO_x$) including nitrogen monoxide (NO) and nitrogen dioxide ($NO_2$) from a waste gas containing nitrogen oxides and carbon dioxide comprising the steps of:

(a) adjusting the molar ratio of $NO/NO_2$ present in the waste gas to approximately 1;

(b) contacting said waste gas having the molar ratio $NO/NO_2$ of approximately 1 with an alkaline scrubbing solution containing alkali metal hydroxides, such as sodium hydroxide and potassium hydroxide, in a first scrubbing column, whereby the nitrogen oxides present in the waste gas are removed from the waste gas;

(c) removing the alkaline scrubbing solution from the scrubbing system of the first scrubbing column before the alkali metal hydroxides are consumed, and;

(d) contacting the gas, containing a relatively high concentration of nitrogen oxides which have been adjusted to a molar ratio $NO/NO_2$ of approximately 1, with said scrubbing solution removed from the scrubbing system of the first scrubbing column in a second scrubbing column, whereby the nitrogen oxides present in the gas are removed and the alkaline compounds contained in the scrubbing solution of the second scrubbing column are neutralized to alkali metal nitrites and nitrates, such as sodium and potassium nitrite.

DESCRIPTION OF THE PREFERRED EMBODIMENTS

As a result of studies conducted by the inventors, it has been found that the reason why $NO_x$ in a gas cannot be removed to a content of 200 ppm or less is the presence of carbon dioxide in the gas to be treated. That is, for instance, when a waste gas from an ammonia oxidation type nitric acid manufacturing plant is used, $CO_2$ is derived from the air which is used for oxidizing ammonia in the presence of catalysts. $CO_2$ adversely affects the removal of $NO_x$ when the $NO_x$ content of the gas is lowered to a content of below 300 through 500 ppm.

In the case where a circulating aqueous alkaline scrubbing solution containing an hydroxide of alkali metals is used, the gas can be purified to such an extent that the $NO_x$ content in the gas becomes approximately 300 through 500 ppm. However, further purification is difficult. This is because the amount of alkali metal carbonate derived from the reaction of alkali metal hydroxide and carbon dioxide is increased in the aqueous alkaline scrubbing solution and because the alkali metal hydroxide becomes absent in the aqueous alkaline scrubbing solution. That is to say, the $NO_x$ removal efficiency is not decreased during the substantial presence of alkali metal hydroxide in the aqueous alkaline scrubbing solution. However, once the alkali metal hydroxide becomes absent in the scrubbing solution, further removal of $NO_x$ from 300 through 500 ppm is very difficult, even if the alkali metal carbonate is present as an alkaline component in the scrubbing solution.

In contrast, it has now been found that when the alkaline scrubbing solution is removed from the scrubbing column before the alkali metal hydroxides contained in the alkaline scrubbing solution are consumed, $NO_x$ present in the waste gas can be scrubbed to a content of less than 200 ppm, for example, approximately 50 ppm. This is due to the fact that a substantial amount of the alkali metal hydroxides is always present in the alkaline scrubbing solution. It has also been found that the alkaline scrubbing solution removed from the first scrubbing column, which mainly contains alkali metal carbonates as an alkaline component, can be easily neutralized by contacting a small amount of a waste gas containing a relatively high content of $NO_x$ adjusted to a $NO/NO_2$ molar ratio of approximately 1, to convert the alkali metal carbonates to the alkali metal nitrites and small amounts of alkali metal nitrates.

According to the present invention, the $NO_x$ content present in a waste gas containing $NO_x$ and $CO_2$ can be easily decreased to less than 200 ppm, for example, approximately 50 ppm by using a far more compact apparatus than that of the conventional process. In addition, the present invention has the industrially advantageous features that only inexpensive and readily available hydroxide of alkali metal hydroxides are used as absorbing agents for $NO_x$ and that $NO_x$ in the waste gas can be recovered as alkali metal nitrites and nitrates.

The process according to the present invention can be advantageously applied to the purification of waste gases containing a wide range, for example, 300 through 20,000 ppm, of $NO_x$ and $CO_2$, which have been derived from various industrial plants. For instance, the process of the present invention is suitable for use in the removal of $NO_x$ from a tail gas from an ammonia type nitric acid manufacturing plant, which gas contains 500 through 10,000 ppm of $NO_x$ and 300 through 500 ppm of $CO_2$ together with nitrogen as a main component. It is also possible to apply the process of the present invention to a waste gas containing sulfur oxides as a pollutant besides nitrogen oxides. However, since, in this case, the recovery of the alkali metal nitrites and nitrates from the scrubbed solution is not easy, the process of the present invention is preferably applied to a waste gas that does not contain sulfur oxides and the like, but which contains 300 through 20,000 ppm, preferably, 300 through 10,000 ppm of $NO_x$ and 1 through 2000 ppm, preferably 1 through 1000 ppm of $CO_2$.

The most essential advantage of this invention resides in the fact that the defects caused in the known processes for the removal of $NO_x$ from waste gases, such as a tail gas containing $NO_x$ and $CO_2$ from an ammonia oxidation type nitric acid manufacturing plant, by using alkali metal hydroxides can be solved. In order to reduce the $NO_x$ content of a waste gas to less than 200 ppm, the important factor is for the scrubbing solution to be removed from the first scrubbing step before the alkali metal hydroxides are consumed. The thus removed alkali metal hydroxides are then contacted with a gas containing a relatively high content of $NO_x$ having the molar ratio of $NO/NO_2$ of approximately 1.

The invention will be now described in details when a scrubbing solution containing sodium hydroxide is used as the alkaline scrubbing solution. It should be, however, noted that potassium hydroxide can be also used instead of sodium hydroxide.

The waste gas containing $NO_x$ and $CO_2$ to be treated in the present invention is adjusted so as to have a $NO/NO_2$ molar ratio of approximately 1, as is done in the conventional processes, for better removal of $NO_x$. The $NO/NO_2$ molar ratio can be easily adjusted according to the known procedure described, for example, in British Patent Specification No. 1,241,576. This procedure will also be illustrated hereinafter with reference to the attached drawings. In the case where a waste gas, containing NO as a main component of $NO_x$, from a nitric acid manufacturing plant is treated, since a gas mainly containing $NO_2$ as $NO_x$ is also produced from the nitric acid manufacturing step, both gases are easily mixed with each other to form a gas containing $NO_x$ having a molar $NO/NO_2$ ratio of approximately 1.

The waste gas containing $NO_x$, having a $NO/NO_2$ molar ratio of approximately 1, and $CO_2$ is contacted with an aqueous alkaline scrubbing solution containing sodium hydroxide in a first scrubbing column to thereby remove the $NO_x$ from the waste gas. It should be noted that the scrubbing solution circulated in the first scrubbing column should contain a substantial amount, for approximately 0.1% or more, of sodium hydroxide and may also contain sodium carbonate. One or more scrubbing columns can be used as the first scrubbing column. The reactions occurring in the first scrubbing column between the $NO_x$ and $CO_2$ present in the waste gas and the sodium hydroxide present in the scrubbing solution may be expressed by the following equations (1) through (3).

$$2NaOH + NO + NO_2 \rightarrow 2NaNO_2 + H_2O \qquad (1)$$

$$2NaOH + 2NO_2 \rightarrow NaNO_2 + NaNO_3 + H_2O \qquad (2)$$

$$2NaOH + CO_2 \rightarrow Na_2CO_3 + H_2O \qquad (3)$$

The first scrubbing column to be used in the present invention may be any conventional type known in the art, such as, for example, packed columns, spray columns and bubbling columns. Packed columns provided with at least one packed layer having a height of 10 through 100 cm are advantageously employed as the first scrubbing column to economically reduce the $NO_x$ content of the waste gas to less than 200 ppm by using a compact apparatus. Although packings used in the packed column can be any of the conventional type, it is preferable to use packings having a specific surface area of not less than 800 $m^2/m^3$, preferably 1000 through 3000 $m^2/m^3$.

If the specific surface area of the packings is less than 800 $m^2/m^3$, it is not preferable that a larger scrubbing column be used to remove the desired amount of $NO_x$ from the gas. Contrary to this, if the packings having too large of a specific surface area are used, the pressure-down of gas passing through the packed layer unpreferably increases.

The invention will be now described in detail when a packed column is used as the first scrubbing column.

The waste gas and the alkaline scrubbing solution containing sodium hydroxide may be contacted with each other in either parallel flow relationship or countercurrent flow relationship. However, the gas and the scrubbing solution are preferably contacted with each other through the packed layer in a parallel flow relationship, due to the fact that a rapid absorption rate can be obtained. The height of the packed layer is usually 10 through 100 cm, preferably 30 through 50 cm, per one layer and one or more packed layers may be provided in the scrubbing column.

The waste gas is generally introduced into the first scrubbing column, at a rate of not more than 3000 $Nm^3/m^2$ hr, preferably 100 through 2500 $Nm^3/m^2$ hr, based on the cross-sectional area of the packed layer, from the top of the scrubbing column. On the other hand, the aqueous alkaline scrubbing solution containing sodium hydroxide is generally introduced into the first scrubbing column, at a rate of 0.5 through 5 $m^3/m^2$ hr, based on the cross-sectional area of the packed layer, over the upper surface of each of the packed layers. Thus, the waste gas and the scrubbing solution are contacted with each other in a parallel flow relationship. The packings can be made of any anticorrosion materials. Typical examples of such materials include synthetic resins such as polyethylene, polypropylene and the like, and metals such as stainless steel, and the like. The packings may be in the form of beads, a net, a spiral, a web and the like. The most preferable packing is in the form of a net made of fine stainless steel wire.

In the case where the packed column provided with at least one packed layer, preferably about ten packed layers, each having a height of 10 through 100 cm, preferably 30 through 50 cm and being packed with a packing having a specific surface area of not less than 800 m$^2$/m$^3$, preferably 1000 through 3000 m$^2$/m$^3$, is used, and where the waste gas and the scrubbing solution are contacted with each other in a parallel flow relationship, the NO$_x$ content of the waste gas containing about 10,000 ppm of NO$_x$ can be reduced to less than 200 ppm, for example, to about 50 ppm.

The aqueous alkaline scrubbing solution may contain only sodium hydroxide, but, since it is circulated in the first scrubbing column, the aqueous alkaline scrubbing solution generally contains, besides sodium hydroxide, salts formed in the first scrubbing column by the reaction of NO$_x$ and CO$_2$ with NaOH, i.e. sodium carbonate, sodium nitrite and sodium nitrate. The typical composition of the aqueous alkaline scrubbing solution circulated in the first scrubbing column is 0.1 through 35% by weight of NaOH, 0.1 through 10% by weight of Na$_2$CO$_3$, 0.1 through 40% by weight of NaNO$_2$ and 0.1 through 10% of NaNO$_3$. In order to recover sodium nitrite and sodium nitrate in the next step from the scrubbing solution after neutralizing the remaining alkaline contained in the scrubbing solution, the use of a higher sodium content, for example, 25 through 35% by weight in terms of sodium hydroxide, in the scrubbing solution is preferable.

The aqueous alkaline scrubbing solution of the first scrubbing column should be taken out from the system before the sodium hydroxide is consumed, as mentioned hereinbefore. In general, the scrubbing solution is preferably taken out before NaOH content of the scrubbing solution decreases to about 0.1 through 3% by weight. The scrubbing solution is continuously or intermittently taken out so as not to decrease the NaOH content of the scrubbing solution to less than 0.1 through 3% by weight.

The NO$_x$ removal rate increases in the first scrubbing column, when a low temperature scrubbing solution is used in the first scrubbing column. However, the temperature of the scrubbing solution of the first scrubbing column is, in general, within the range of from −10° C. to 60° C., preferably 15° C. to 40° C.

The scrubbing solution removed from the first scrubbing column is introduced into a second scrubbing column, in which the scrubbing solution is contacted with a small amount of waste gas containing a relatively high concentration of nitrogen oxides having a NO/NO$_2$ molar ratio of approximately 1.0. Thus, the alkaline compounds contained in the scrubbing solution are neutralized to form an aqueous solution containing sodium nitrite, as a main component, and a small amount of sodium nitrate. The reactions of sodium hydroxide and sodium carbonate present in the scrubbing solution with NO$_x$ in the second scrubbing column may be represented by the following equations (4) through (7).

$$2NaOH + NO + NO_2 \rightarrow 2NaNO_2 + H_2O \quad (4)$$

$$2NaOH + 2NO_2 \rightarrow NaNO_2 + NaNO_3 + H_2O \quad (5)$$

$$Na_2CO_3 + NO + NO_2 \rightarrow 2NaNO_2 + CO_2 \quad (6)$$

$$Na_2CO_3 + 2NO_2 \rightarrow NaNO_2 + NaNO_3 + CO_2 \quad (7)$$

It should be noted that a gas containing a relatively high concentration of NO$_x$, for example, 1.0 through 60% by volume of NO$_x$, must be used in the second scrubbing solution. This is because, when a gas containing a relatively high concentration of NO$_x$ is used, not only the reactions (4) and (5), but also the reactions (6) and (7) take place in the second scrubbing column, so that the NO$_x$ contained in the gas can be effectively recovered as sodium nitrite and nitrate.

The second scrubbing column to be used in the present invention may be any conventional type known in the art. A packed column provided with at least one packed layer having a height of 10 through 100 cm, preferably 30 through 50 cm, and packed with packings of a specific surface area of not less than 800 m$^2$/m$^3$, preferably 1000 through 3000 m$^2$/m$^3$, can be advantageously employed as in the first scrubbing column. Since, in the second scrubbing column, the alkaline compounds can be neutralized by a small amount of a gas containing a high content of NO$_x$, there is an advantage that a large scrubbing column is not required. A high NO$_x$ content for the NO$_x$ containing gas utilized in neutralizing the alkaline compounds present in the scrubbing solution is preferable as mentioned hereinabove. Such NO$_x$ content is, in general, 1.0 through 60% by volume and, preferably, 8 through 12% by volume. If the NO$_x$ content is low, not only is a large scrubbing column needed, but also the NO$_x$ removal rate decreases, even though a large scrubbing column is used. In addition, the decomposition of sodium carbonate in the scrubbing solution decreases and, in turn, since the content of sodium nitrate in the neutralized solution increases, the recovery of sodium nitrite and nitrate is hampered.

The gas containing a high NO$_x$ content and having a NO/NO$_2$ molar ratio of approximately 1 which is to be used in the second scrubbing step of the present invention may be any gas which contains no pollutant besides NO$_x$. In general, a gas mainly containing an inert gas, such as nitrogen, besides a relatively high content of NO$_x$ is suitably used. Such gas can be easily prepared by, for example, mixing: (a) a portion of a gas derived from an ammonia oxidation step of a nitric acid manufacturing plant and containing NO$_x$ having a NO/NO$_2$ molar ratio of more than 1, and; (b) a portion of a gas containing NO$_x$ having a NO/NO$_2$ molar ratio of approximately 0.1 and derived from a NO oxidation step in which the gas from the ammonia oxidation step is oxidized by, for example, an air. The mixing ratio of both gases will be easily determined by those skilled in the art so as to form a mixed gas containing NO$_x$ having a NO/NO$_2$ molar ratio of approximately 1. Other gases containing a high content of NO$_x$ are easily available from other steps of a nitric acid manufacturing plant. In addition after the recovered aqueous solution containing sodium nitrite and sodium nitrate in the second scrubbing column is crystalized to separate sodium nitrite, NaNO$_2$ present in a portion of the filtrate usually containing about 38% of NaNO$_2$ and about 17% of NaNO$_3$, is reacted with a mineral acid such as nitric acid to generate a NO$_x$ containing gas. This NO$_x$ containing gas can be also used as the gas containing a high content of NO$_x$.

The gas containing a high content of NO$_x$ having a NO/NO$_2$ molar ratio of approximately 1 is introduced into the second scrubbing column in such an amount that the NO$_x$ contained in the gas may neutralize the alkaline compounds, such as sodium hydroxide and sodium carbonate, contained in the scrubbing solution. In the case where the above-mentioned packed column is used as the second scrubbing column, the gas is generally introduced at a rate of not more than 3000 Nm$^3$/m$^2$ hr, preferably 100 through 2500 Nm$^3$/m$^2$ hr, based on the cross-sectional area of the packed layer, from the top of the second scrubbing column. On the other hand, the aqueous scrubbing solution containing sodium hydroxide and sodium carbonate is generally introduced into the second scrubbing column at a rate of 0.5 through 5 m$^3$/m$^2$ hr, based on the cross-sectional area of the packed layer, over the upper surface of each of the packed layers. The gas and the scrubbing solution may be contacted with each other in either a parallel flow relationship or a countercurrent relationship. The NO$_x$ removal rate increases, when a low temperature scrubbing solution is used in the second scrubbing column. The temperature of the second scrubbing column is generally within the range of from 10° through 40° C. for economic reasons. The scrubbing solution is preferably circulated in the second scrubbing column until the alkaline compounds such as sodium hydroxide and sodium carbonate are substantially consumed.

The recovered aqueous scrubbing solution obtained by contacting the scrubbing solution from the first scrubbing column with the gas containing a high NO$_x$ content contains, as a main component, sodium nitrite together with a small amount of sodium nitrate. This recovered solution is concentrated and, then, crystallized to form sodium nitrite precipitate. The recovered sodium nitrite is separated and, from the resultant filtrate, sodium nitrate is recovered.

The invention will be better understood from the description set forth below, with reference to the accompanying drawings, in which a waste gas containing NO$_x$ and CO$_2$ exhausted from an ammonia oxidation type nitric acid manufacturing plant is scrubbed. It should be noted that the present invention is by no means limited to the embodiments shown in these drawings.

Figure 1:
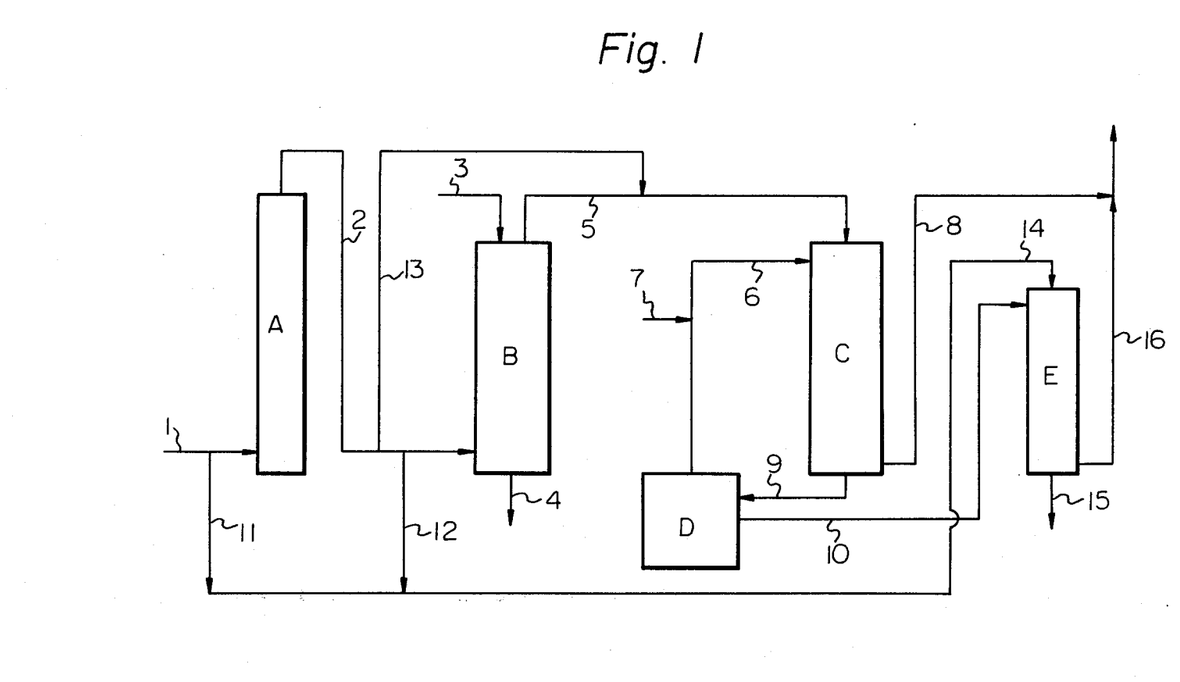
FIG. 1 is a schematic flow chart showing an embodiment of the process for removing NO$_x$ from the waste gas according to the present invention.

A gas containing about 9 through 11.5% by volume of NO$_x$ and about 300 through 500 ppm of CO$_2$, which are derived from an ammonia oxidation step of a nitric acid manufacturing plant, is fed through line 1 into oxidation column A. In the oxidation column, NO contained in the gas is oxidized into NO$_2$ by, for example, air. The gas thus oxidized contains about 9 through 11.5% by volume of NO$_x$ (a molar ratio of NO/NO$_2$: 0.1-0.3) and about 300 through 500 ppm of CO$_2$, and is fed through line 2 into absorption column B. In absorption column B, the gas so fed is countercurrently washed with water fed through line 3, whereby NO$_x$ acid contained in the gas is absorbed into the water and nitric acid is removed through line 4. The waste gas is discharged through line 5 from absorption column B.

The waste gas thus discharged from line 5 generally contains 500 to 10,000 ppm of NO$_x$ and 300 through 500 ppm of CO$_2$. The molar ratio of NO/NO$_2$ in this waste gas is 1.5 through 9. The waste gas is mixed with a portion of the waste gas from the oxidation column, having a NO/NO$_2$ ratio of 0.1 through 0.3, through line 13 so as to adjust the NO/NO$_2$ molar ratio of the mixed gas to approximately 1.

The mixed waste gas so adjusted is fed to the top of first scrubbing column C. On the other hand, an aqueous scrubbing solution containing sodium hydroxide is introduced into first scrubbing column C from vessel D through line 6 aand returned to vessel D through line 9. Thus, the waste gas and the scrubbing solution are, in a parallel flow relationship, contacted with each other in first scrubbing column C. The purified waste gas is discharged from column C through line 8. The NO$_x$ content of the purified waste gas is generally 200 ppm or less.

In the operation of first scrubbing column C, since the NO$_x$ removal rate suddenly decreases when sodium hydroxide becomes absent in the scrubbing solution, an aqueous sodium hydroxide solution is continuously or intermittently added to the scrubbing solution through line 7, so as to maintain the content of sodium hydroxide in the scrubbing solution to a level of at least 0.1% by weight. The scrubbing solution may be an aqueous sodium hydroxide solution. However, since the scrubbing solution is usually circulated in the scrubbing system of the first scrubbing column C, it contains sodium nitrite and nitrate derived from the reactions of NO$_x$ and sodium hydroxide, sodium carbonate derived from the reaction of carbon dioxide and sodium hydroxide, as well as sodium hydroxide. A typical composition of the scrubbing solution is 0.1 through 35% of NaOH, 0.1 through 40% of NaNO$_2$, 0.1 through 10% of NaNO$_3$ and 0.1 through 10% of Na$_2$CO$_3$.

First scrubbing column C can be any of the conventional type absorption columns, as mentioned hereinbefore. However, it is preferable to use a column as that shown in FIG. 2, which has at least one packed layer 20 having a height of 10 through 100 cm and which is packed with a packing having a specific surface area of not less than 800 m$^2$/m$^3$, preferably 1000 through 3000 m$^2$/m$^3$. The number of packed layers 20 can be suitably selected depending on, for example, the NO$_x$ content in the waste gas, although three packed layers 20 are shown in FIG. 2.

Figure 2:
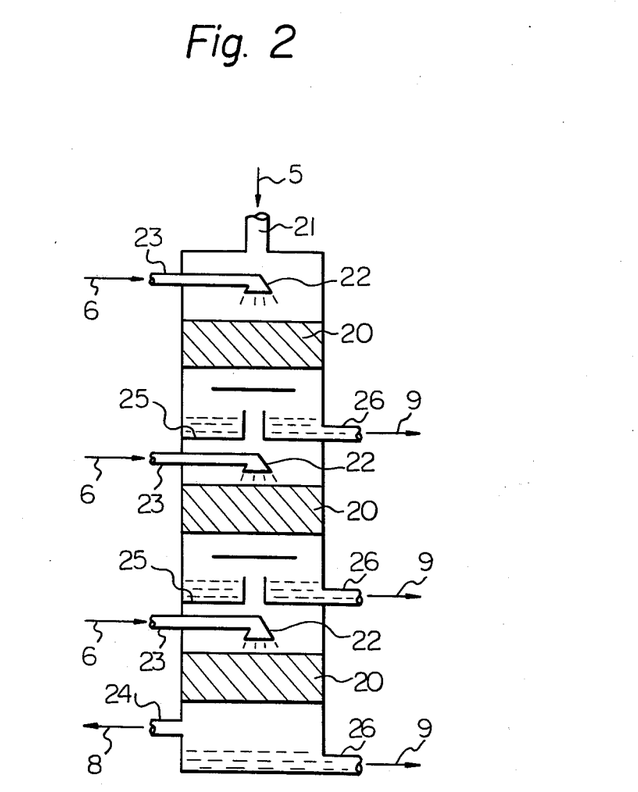
FIG. 2 is a schematic sectional view showing the structure of a first scrubbing column suitably used in the present invention.

In the scrubbing column shown in FIG. 2, the waste gas from line 5 is fed to the column through a gas inlet 21 at a rate of 3000 Nm$^3$/m$^2$ hr or less, preferably within the range of from 100 to 2500 Nm$^3$/m$^2$ hr, based on the cross-sectional area of packed layer 20. The waste gas is discharged from gas outlet 24 after passing through each packed layer 20.

On the other hand, the scrubbing solutions from the lines 6 are fed separately to each packed layer 20 through liquid inlets 23, provided with spray nozzles 22, at a rate of 0.5 through 5 m$^3$/m$^2$ hr, based on a cross-sectional area of the packed layer 20. The scrubbing solution is uniformly sprayed over the upper surface of each packed layer 20. The scrubbing solution is, in a parallel flow relationship, contacted with the downflowing waste gas in the packed layer 20, whereby NO$_x$ and CO$_2$ present in the waste gas are absorbed into the scrubbing solution. The scrubbing solutions are received in scrubbing solution receivers 25 and returned to vessel D through liquid outlets 26.

The aqueous scrubbing solution removed by line 9 of first scrubbing column C generally contains 0.1 through 3% NaOH, 0.1 through 40% NaNO$_2$, 0.1 through 10% NaNO$_3$ and 0.1 through 10% Na$_2$CO$_3$, and is returned to vessel D. This aqueous scrubbing solution is circulated to first scrubbing column C as a scrubbing agent, that an alkaline scrubbing solution containing no sodium hydroxide was used in the first scrubbing column. The $NO_x$ content of the off-gas from the first scrubbing column was 350 through 450 ppm.

TABLE

| | First Scrubbing Column | Second Scrubbing Column |
|---|---|---|
| Inner diameter (m) | 4 | 0.5 |
| Height (m) | 10 | 20 |
| Number of packed layers | 8 | 16 |
| Diameter of packed layer (m) | 4 | 0.5 |
| Cross-sectional area of packed layer ($m^2$) | 12.57 | 0.20 |
| Height of packed layer (cm) | 30 | 30 |
| Specific surface area of packing ($m^2/m^3$) | 1780 | 1780 |
| Packing | Net made of* stainless steel | Net made of* stainless steel |

*Mesh Demister R Style manufactured by Japan Mesh Industries Ltd.

What we claim is:

1. A process for removing nitrogen oxides ($NO_x$) including nitrogen monoxide (NO) and nitrogen dioxide ($NO_2$) from a waste gas containing 300–20,000 ppm of said nitrogen oxides and 1–2,000 ppm carbon dioxide by contacting said waste gas with an alkali metal hydroxide scrubbing solution comprising the steps of:
   (a) adjusting the molar ratio of $NO/NO_2$ present in said waste gas to approximately 1;
   (b) causing said waste gas and said alkali metal hydroxide scrubbing solution to flow in the same direction and contacting, in a parallel flow relationship, said waste gas with said alkali metal hydroxide scrubbing solution in a first scrubbing column provided with at least one packed layer having a height of 10–100 cm and packed with a packing having a specific surface area of not less than 800 $m^2/m^3$, whereby the nitrogen oxides present in said waste gas are removed;
   (c) removing the scrubbing solution from said first scrubbing column before said alkali metal hydroxide is completely consumed, and;
   (d) contacting a gas containing a relatively high concentration of nitrogen oxides adjusted to a molar ratio of $NO/NO_2$ of approximately 1 and having a ($NO_x$) content of 1.0–60.0% by volume with said removed scrubbing solution in a second scrubbing column, whereby the nitrogen oxides present in said gas are removed and alkaline compounds in the scrubbing solution are neutralized to alkali metal nitrites and nitrates.

2. The process as claimed in claim 1, wherein said waste gas containing $NO_x$ and $CO_2$ comprises a tail gas from an ammonia oxidation type nitric acid manufacturing plant.

3. The process as claimed in claim 1, wherein said alkali metal is at least one metal selected from the group consisting of sodium and potassium.

4. The process as claimed in claim 1, wherein said alkaline compounds mentioned in step (d) comprise compounds selected from the group consisting of alkali metal hydroxides and alkali metal carbonates, and mixtures of these compounds.

5. The process as claimed in claim 1, wherein said packing comprises a stainless steel wire net.

6. The process as claimed in claim 1, wherein said scrubbing solution contains 0.1 through 35% of NaOH, 0.1 through 40% of $NaNO_2$, 0.1 through 10% of $NaNO_3$ and 0.1 through 10% of $Na_2CO_3$.

7. The process as claimed in claim 1, wherein said step (b) comprises introducing waste gas into said first scrubbing column at a rate of not more than 3,000 $Nm^3/m^2$ hr, based on the cross-sectional area of said packed layer; and introducing said scrubbing solution into said first scrubbing column over said packed layer at a rate of 0.5 through 5 $m^3/m^2$ hr, based on the cross-sectional area of said packed layer.

8. The process as claimed in claim 7, comprising said waste gas at a rate within the range of from 100 to 2,500 $Nm^3/m^2$ hr.

9. The process as claimed in claim 1, wherein said packed layer height is 30 through 50 cm and said packing specific surface area is 1,000 through 3,000 $m^2/m^3$.

10. The process as claimed in claim 1, wherein the nitrogen oxide content of said gas specified in step (d) is 8 through 12% by volume.

11. A process for removing nitrogen oxides ($NO_x$) including nitrogen monoxide (NO) and nitrogen dioxide ($NO_2$) from a waste gas containing 300–20,000 ppm of said nitrogen oxides and 1–2,000 ppm carbon dioxide comprising the steps of:
   (a) adjusting the molar ratio of $NO/NO_2$ present in said waste gas to approximately 1;
   (b) contacting, in a parallel flow relationship, said waste gas with an alkaline scrubbing solution containing sodium hydroxide in a first scrubbing column, whereby the nitrogen oxides present in the waste gas are removed, said first scrubbing column having at least one packed layer having a height of 30 through 50 cm and packed with a packing having a specific surface area of 1,000–3,000 $m^2/m^3$, said waste gas being introduced into said first column at a rate of 100–2,500 $Nm^3/m^2$ hr, based upon the cross sectional area of said packed layer, said scrubbing solution being introduced over said packed layer and into said first column at a rate of 0.5–5 $m^3/m^2$ hr, based upon the cross-sectional area of said packed layer;
   (c) removing said alkaline scrubbing solution from said first scrubbing column before said sodium hydroxide is consumed, and;
   (d) contacting a gas containing 1.0 through 60.0% by volume nitrogen oxides adjusted to a molar ratio of $NO/NO_2$ of approximately 1 with said removed scrubbing solution in a second scrubbing column, whereby the nitrogen oxides present in said gas are removed and sodium hydroxide and sodium carbonate contained in said scrubbing solution are neutralized to sodium nitrite and sodium nitrate.

12. The process as claimed in claim 11, wherein said waste gas containing $NO_x$ and $CO_2$ comprises a tail gas from an ammonia oxidation type nitric acid manufacturing plant.

13. The process as claimed in claim 11, wherein said packing comprises a stainless steel wire net.

14. The process as claimed in claim 11, wherein said alkaline scrubbing solution contains 0.1 through 35% of NaOH, 0.1 through 40% of $NaNO_2$, 0.1 through 10% of $NaNO_3$ and 0.1 through 10% of $Na_2CO_3$.

15. The process as claimed in claim 12, wherein said tail gas contains 500 through 10,000 ppm $NO_x$ and 300 through 500 ppm $CO_2$.

16. The process as claimed in claim 12, wherein the nitrogen oxide content of said gas specified in step (d) is 8 through 12% by volume.

* * * * * with or without the addition of an aqueous sodium hydroxide solution from line 7 through line 6 (refer to FIG. 1), whereas a portion of the aqueous scrubbing solution is introduced into second scrubbing column E through line 10 from vessel D. The aqueous scrubbing solution from first scrubbing column C can be directy introduced into second scrubbing column E without passing through vessel D.

Into second scrubbing column E, a small amount of a gas containing a relatively high content of $NO_x$, having a $NO/NO_2$ molar ratio of approximately 1, is introduced through line 14. This gas containing a relatively high $NO_x$ content of can be easily prepared by, for example, mixing a portion of the gas derived from a nitric acid manufacturing process comprising the air oxidation of ammonia in the presence of appropriate catalysts such as Pt, Rh, Pt-Ph (i.e. the gas from line 1), which mainly contains NO as nitrogen oxides, with the gas from the outlet of oxidation column A, which mainly contains $NO_2$ as nitrogen oxides, so as to make the $NO/NO_2$ molar ratio of the mixed gas approximately 1. These gases are fed from lines 11 and 12, respectively. The $NO_x$ content of the mixed gas is generally within the range of from 9 to 11.5% by volume.

In second scrubbing column E, the scrubbing solution from line 10 and the waste gas from line 14 containing a relatively high $NO_x$ content of, having a $NO/NO_2$ molar ratio of approximately 1, are contacted with each other to cause the reactions (4) through (7) mentioned hereinbefore. Thus, the sodium hydroxide and the sodium carbonate contained in the scrubbing solution are consumed to form an aqueous solution, generally containing 34 through 40% $NaNO_2$ and 2 through 10% $NaNO_3$, which is discharged through line 15. Purified gas having only a very small amount of $NO_x$ is discharged through line 16 into the open air together with the off-gas from line 8. The scrubbing solution is generally circulated in the second scrubbing column E until sodium hydroxide and sodium carbonate are substantially absent in the scrubbing solution.

The aqueous solution mainly containing sodium nitrite from line 15 is concentrated to easily precipitate the sodium nitrite crystals. The sodium nitrite can be recovered by, centrifuging the concentrated solution, for example. From the separated filtrate sodium nitrate is recovered.

As explained hereinbefore, in the case where the process of the present invention for the removal of $NO_x$ according to the present is applied to a waste gas from a nitric acid manufacturing plant, the $NO_x$ content of the treated-gas exhausted to the atmosphere can be decreased to less than 200 ppm (e.g. approximately 50 ppm) by installing the scrubbing apparatus of this invention, which is far smaller than in existent nitric acid manufacturing plant. According to the present invention, sodium nitrite and sodium nitrate can be easily recovered from an $NO_x$ containing waste gas by using cheaper and readily available sodium hydroxide. In addition, the following other advantages are also obtained in accordance with the present invention:

(1) The waste gas containing a relatively high $NO_x$ content having a $NO/NO_2$ molar ratio of approximately 1, which is used in the post-treatment of the scrubbing solution, is readily available from a nitric acid manufacturing plant and also from the remaining filtrate after sodium nitrite precipitate separation.

(2) Since waste gases from nitric acid manufacturing plants not usually contain air-pollutants other than $NO_x$, and since these gases containing a high $NO_x$ content are used, high purity sodium nitrite and nitrate can be easily recovered;

(3) The post-treatment of the scrubbing solution can be easily carried out and secondary pollution does not occur; and (4) The operation and maintenance service of the scrubbing apparatus are easy to carry out and the construction cost thereof is cheap.

The present invention is further illustrated by, but by no means limited to, the following Example.

EXAMPLE

A gas scrubbing test was carried out by using a process flow as shown in FIG. 1.

Into a waste gas containing 8442 ppm of $NO_x$ ($NO/NO_2$ molar ratio: 1.5) and 450 ppm of $CO_2$ from line 5, which is derived from absorption column B of a nitric acid manufacturing plant, a gas containing 9.4% $NO_x$ by volume ($NO/NO_2$ molar ratio: 0.11) from line 13 was added to produce a mixed gas containing about 10000 ppm of $NO_x$ ($NO/NO_2$ molar ratio: approximately 1). The mixed gas was continuously introduced into first scrubbing column C as shown in FIG. 2 through gas inlet 21 at a rate of about 12500 $Nm^3/hr$. Simultaneously, a scrubbing solution containing about 2.1% NaOH, about 33.4% $NaNO_2$, about 3.6% $NaNO_3$, about 2.5% $Na_2CO_3$ and about 58.4% $H_2O$, and having a temperature of 30° through 35° C., was fed to each of the packed layers 20 of first scrubbing column C at a rate of about 40 $m^3/hr$ through each liquid inlet 23. Thus, the mixed gas and the scrubbing solution passed downwardly through a packed layer 20 to contact each other in a parallel flow relationship. The off-gas from gas outlet 24 contained 60 through 130 ppm $NO_x$ and was blown into an atmosphere.

The scrubbing solution removed from first scrubbing column C contained about 2.0% NaOH, about 33.5% $NaNO_2$, about 3.6% $NaNO_3$, about 2.5% $Na_2CO_3$ and about 58.4% $H_2O$. This scrubbing solution was returned to receiver D through line 9 and recycled to first scrubbing column C after adding thereto an aqueous sodium hydroxide solution so as to adjust the composition of the scrubbing solution.

A portion of the scrubbing solution in receiver D was introduced into second scrubbing column E, having a similar structure to that shown in FIG. 2, through each liquid inlet at a rate of 0.6 $m^3/hr$, whereby it was contacted with a gas containing 9.8% by volume $NO_x$ having the $NO/NO_2$ molar ratio of about 1, which was fed through line 14 at a rate of 175 $Nm^3/hr$. Thus, gas the alkaline compounds present in the scrubbing solution were neutralized with the $NO_x$ contained in the gas, and an aqueous solution containing about 38.6% of $NaNO_2$, about 4.2% of $NaNO_3$ and about 57.2% $H_2O$ was recovered from second scrubbing column E.

The off-gas from second scrubbing column E was discharged into an atmosphere together with the off-gas from the first scrubbing column. The $NO_x$ content of the mixed off-gas was within the range of from 65 to 135 ppm. The $NO_x$ content was determined according to a chemical luminescense method. The $NO_x$ content of the off-gas was kept below 135 ppm over a nine-month long continuous operation without any trouble. The specifications for the first and second scrubbing columns are shown in the table below.

As a comparative example, a scrubbing test according to the example mentioned above was repeated, except

UNITED STATES PATENT AND TRADEMARK OFFICE
CERTIFICATE OF CORRECTION

PATENT NO. : 4,145,399
DATED : March 20, 1979
INVENTOR(S) : Tokuzo Nagaoka et al It is certified that error appears in the above-identified patent and that said Letters Patent are hereby corrected as shown below:

Column 2, line 19, after "potassium nitrite", insert -- and nitrate--.

Column 4, line 3, delete "approximately" and insert --example--.

Column 9, line 13, after "content", delete "of".

Column 9, line 27, after "content", delete "of".

Column 9, lines 48 and 49, delete "for the removal of $NO_x$ according to the present".

Column 9, line 54, after "than", insert --those now utilized--.

Column 9, line 55, delete "plant", and insert --plants--.

Column 10, line 50, after "which", insert --gas--.

Column 10, line 51, after "Thus", delete "gas".

UNITED STATES PATENT AND TRADEMARK OFFICE
CERTIFICATE OF CORRECTION

PATENT NO. : 4,145,399
DATED : March 20, 1979
INVENTOR(S) : Tokuzo Nagaoka et al It is certified that error appears in the above-identified patent and that said Letters Patent are hereby corrected as shown below:

Column 12, line 4, after "introducing", insert --said--.

Column 12, line 11, after "comprising", insert --introducing--.

Column 12, line 65, "12" should be --11--.

Signed and Sealed this

Twenty-seventh Day of May 1980

[SEAL]

Attest:

SIDNEY A. DIAMOND
Attesting Officer       Commissioner of Patents and Trademarks